United States Patent Office 3,427,611
Patented Feb. 11, 1969

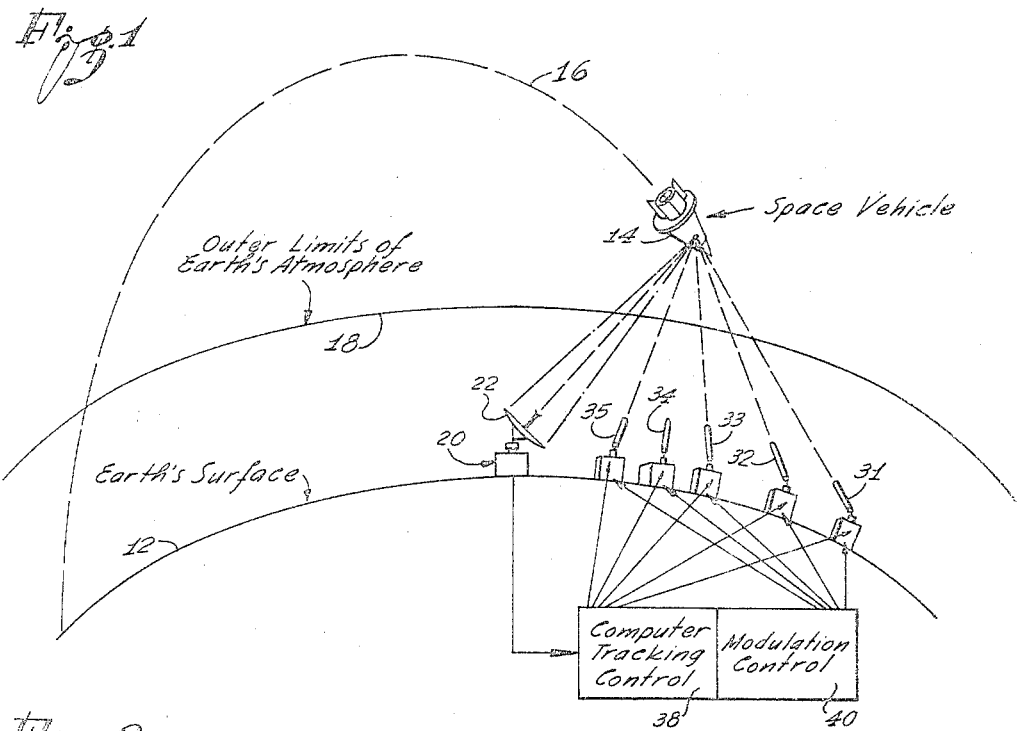
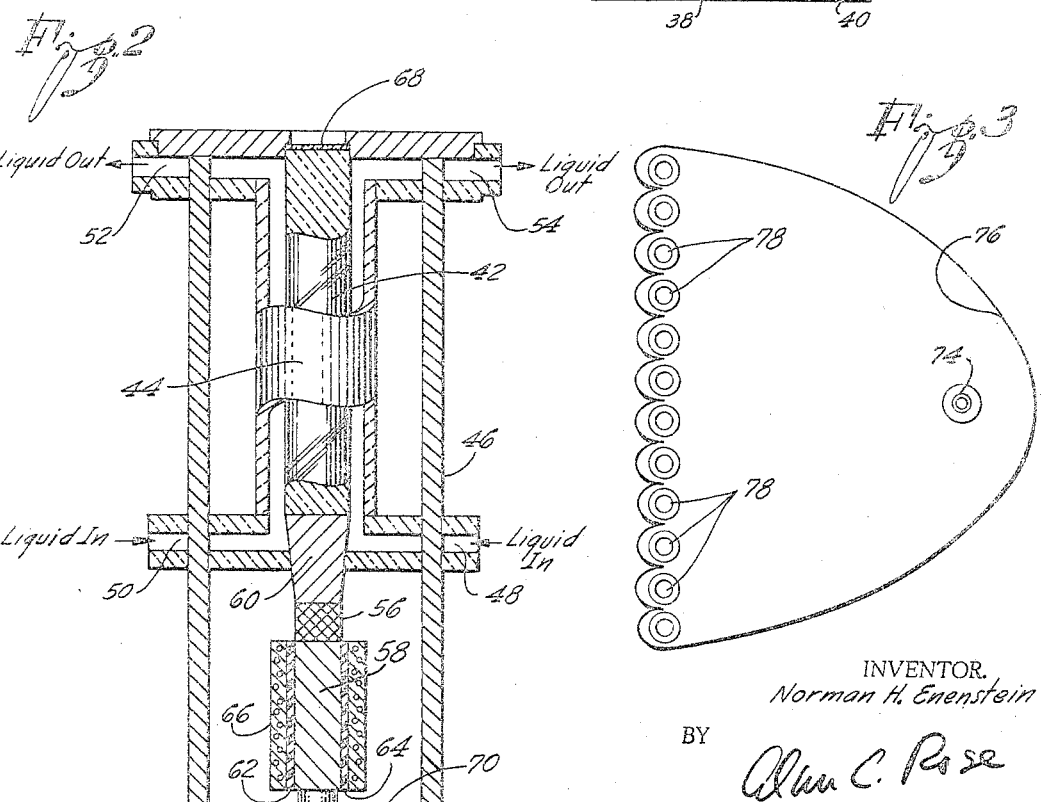

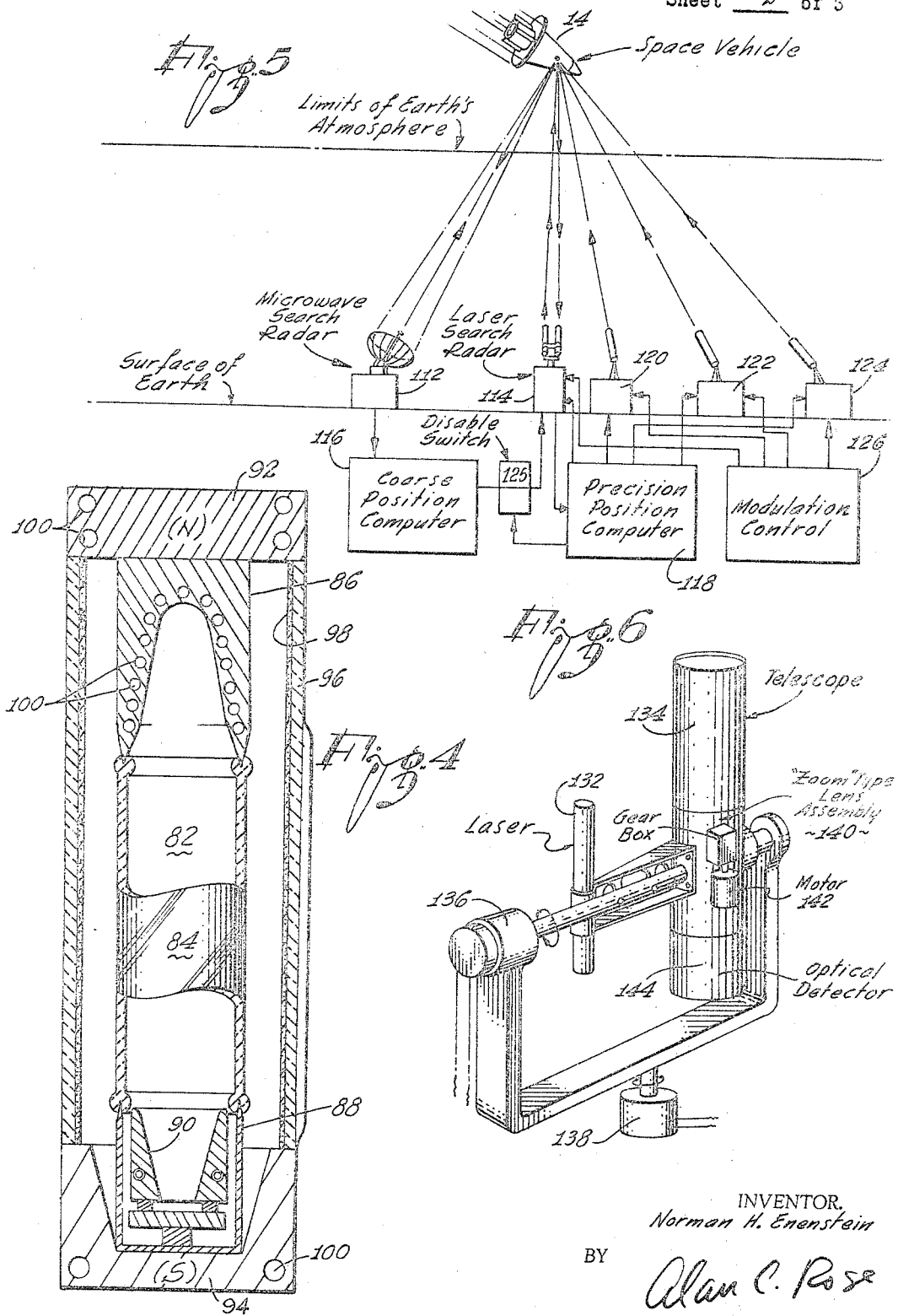

3,427,611
LASER SYSTEM
Norman H. Enenstein, Tarzana, Calif., assignor to Litton Industries, Inc., Beverly Hills, Calif.
Filed Aug. 15, 1962, Ser. No. 217,161
U.S. Cl. 343—6          7 Claims
Int. Cl. G01s 9/62

This invention relates to laser systems and more particularly to arrangements for directing a laser beam or an array of lasers in a predetermined direction.

The laser is a relatively recent scientific development. The acronym "laser" stands for Light Amplification by Stimulated Emission of Radiation. The term "laser" is applied to light oscillators which operate like lasers, as well as to amplifiers. Lasers are characterized by the excitation of particles such as atoms or molecules into excited states and the subsequent radiation of energy from the excited particles in phase. The resulting coherent energy may be of remarkably high intensity. Some of the promising fields of application for lasers are described in a review article in the June 1961 issue of Scientific American at pages 52 through 61. The article was entitled, "Optical Masers," and was written by Arthur L. Schawlow.

Lasers may produce high levels of radiant energy in the visible, ultraviolet, or infrared frequency ranges. It has therefore been proposed that they might be employed as military weapons. One important factor which has prevented their use for this purpose is that energy levels which are sufficiently high to cause substantial damage, also ionize the air and introduce great losses into the beam transmission path.

An important object of the present invention is to use the laser principle in effective military weapons.

In accordance with one aspect of the present invention, an array of spaced lasers are controlled to point at a single object. The individual lasers are of such intensity that they will not separately ionize the atmosphere so as to produce high loss in the transmitted energy. On the other hand, at the surface of the object upon which the lasers are all directed, the heating effect is cumulative so that destruction or severe damage to the object may be accomplished.

In accordance with one important phase of the present invention, a position detection apparatus such as microwave radar may be employed to locate space vehicles far above the surface of the earth, and this position information may be employed to direct an array of lasers toward the space vehicle. Upon energization of all of the lasers so as to impinge on the space vehicle simultaneously, the resultant temperature shock wave will severely damage or destroy the space vehicle.

In accordance with another aspect of the invention, two object location systems may be employed. A coarse microwave radar system may be used to provide an initial position of a remote object, and a laser search radar may be oriented to a first approximation in accordance with this position data. After the laser radar makes contact with the remote object, the coarse microwave radar is disabled and more precise position data is obtained from the laser radar. The remaining lasers in a laser array may then be directed toward the remote object, and they may be all energized in synchronism to apply energy to destroy or damage the remote object.

Another problem in the laser radar field involves the complex angle detection schemes which have been proposed for tracking and orientation of the laser radar apparatus. In accordance with another aspect of the invention, the laser radar may advantageously be provided with a simplified light detection arrangement, and a "zoom"-type lens assembly. The arrangements may be employed to increase the magnification of incoming signals while maintaining them in focus, thereby increasing the positional accuracy of the laser radar as it centers on reflections from the remote object.

One important advantage of the present invention lies in the interception of space vehicles such as intercontinental ballistic missiles. Thus, for example, long-range search radars which are currently available can detect missiles while they are still far above the earth's atmosphere. Powerful, widely-dispersed laser units may be directed at the incoming missile while it is still above the earth's atmosphere, and the energy from these lasers will damage or destroy the missile while it is still in space. Moreover, the rays from the lasers do not converge upon the space vehicle except in outer space where there is no air to be ionized; accordingly, the radiant energy is only attenuated to a moderate extent along its path to the missile.

Arrays of lasers are also applicable to space communication systems, where the great distance require high levels of power output.

Other objects, features and advantages of the present invention will be readily apparent from a consideration of the following detailed description and the accompanying drawings, in which:

FIG. 1 is a schematic showing of an array of lasers employed to radiate energy toward a space vehicle;

FIG. 2 illustrates one representative laser assembly which may be employed in the system of FIG. 1;

FIG. 3 shows a suitable geometrical configuration for applying light from light sources to the laser rod;

FIG. 4 shows an illustrative ultraviolet flash source for use with the arrangement of FIG. 2;

FIG. 5 is a schematic diagram of a laser array system in accordance with the invention in which both a microwave radar and a laser radar are employed;

FIG. 6 is a schematic showing of the physical configuration of a laser radar apparatus;

Figure 7:
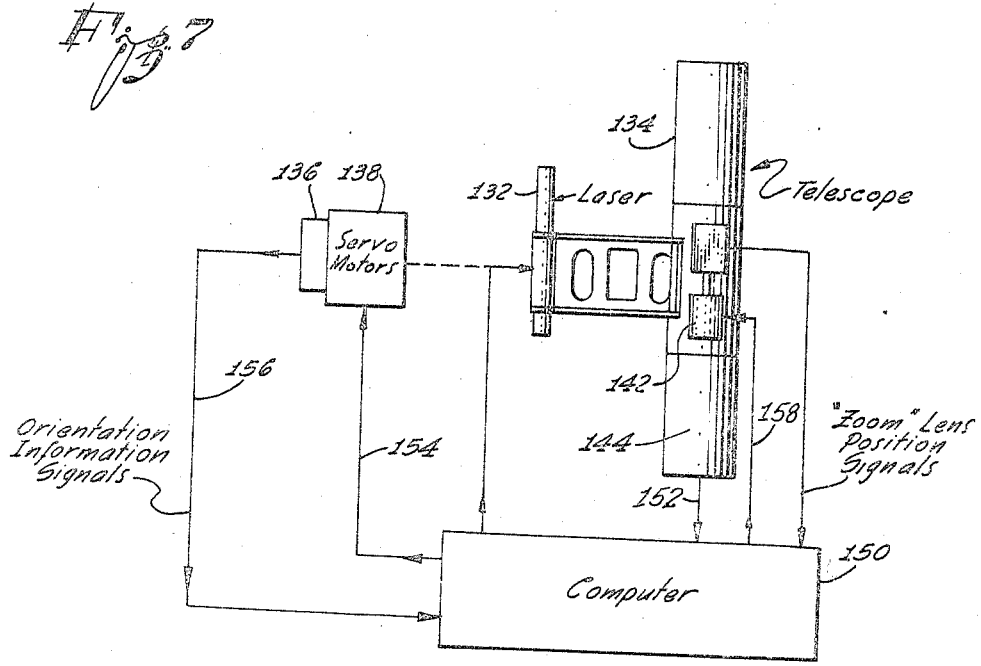
FIG. 7 is a block circuit diagram for use with the apparatus of FIG. 6.

Referring more particularly to the drawings, FIG. 1 shows the earth's surface 12 and a space vehicle 14 following a trajectory 16 which carries it well above the outer limits of the earth's atmosphere designated by the line 18 in FIG. 1. A microwave radar system 20 is provided to track the space vehicle 14. While the radar system 20 is shown provided with a parabolic antenna 22, it is contemplated that other more accurate forms of radar position systems would actually be employed. Thus, for specific example, extended antenna arrays which are scanned electronically either by phase shift or other techniques, will normally be employed in present-day radar systems.

In addition to the radar system 20, an array of widely-spaced laser apparatus 31 through 35 is provided. Signals from the search radar apparatus 20 are routed to the tracking control computer 38. The tracking control computer 38 is supplied with information relating to the trajectory of space vehicle 14, and the position of the laser installations 31 through 35. With this information, the computer 38 supplies orientation signals to each of lasers 31 through 35 to point them at the space vehicle 14. The modulation control circuit 40 applies signals to the lasers 31 through 35 so that pulses of energy are received at the object 14 simultaneously. In weaponry applications, the modulation circuit 40 may be arranged for manual control by an operator or for automatic control at the highest pulse repetition rate available with the particular laser installations.

FIG. 2 is a schematic diagram of a typical laser installation which may be employed. The heart of the laser is a rod 42 of material such as ruby crystal, which may be described chemically as chromium-doped aluminum oxide. Other known laser materials include calcium tungstate doped with neodymium and various gases.

Concentric with the active laser element 42 are the cylindrical housing elements 44 and 46. The inner member 44 may be of glass tubing, and the outer element 46 is a spacer having a precise length. Water is supplied through the channels 48 and 50 to the space between the laser rod 42 and the glass tubing 44. The cooling water is exhausted through passageways 52 and 54. Suitable switching arrangements are provided at one end of the laser rod 42 for initiating or terminating laser action. The switching structure includes a polarization rotator 56 and a Kerr cell 58. An adapter section 60 couples light from the laser rod 42 to the switching elements 56 and 58. With regard to the Kerr cell, it serves to selectively rotate the plane of polarization of applied light, depending upon the application of an electric field between plates 62 and 64. The Kerr cell is provided with a heater coil 66 to maintain it at the proper operating temperature. The cell may be of the type described in an article by A. M. Zaren, F. R. Marshall, and F. L. Poole entitled, "An Electro-Optical Shutter for Photographic Purposes," which appeared in the transaction of the AIEE, vol. 68, Apr. 30, 1949, paper 49–24. In accordance with the usual practice, the laser optical system is provided with a front mirror 68 and a rear mirror 70. When the light switch 56, 58 is turned on, to permit the transmission of light to the mirror 70 and back to the laser rod, laser action is induced by the cumulative interaction of excited atoms emmitting light as the synchronously switch energy states. When the light switch is turned off so that destructive interference takes place within the Kerr cell and the polarization rotator 56, laser action stops, because the cumulative effect of multiple reflections between mirrors 68 and 70 produces high output laser action.

High intensity light sources must be provided to excite the laser rod 42. A suitable arrangement for laser excitation is shown in FIG. 3. In this figure, the laser 74 is located at the focus of the parabolic reflector 76. A series of pump lamps with phosphor converter cylinder 78 transmit light of the proper frequency spectrum to the parabolic mirror 76 to be reflected toward the laser rod 74. The principle of phosphor energization of a laser for high conversion efficiencies is described in the copending application of Norman F. Fyler, Ser. No. 164,953, filed Jan. 8, 1962.

FIG. 4 shows a typical pump lamp configuration. It includes a central chamber 82 filled with mercury gas. The chamber includes a section of quartz tubing 84, an electron collector 86, and a metal sleeve 88. The cathode 90 is located at the end of the chamber 82 remote from the electron collector 86. The two polepieces 92 and 94 which apply a magnetic field to the gas discharge chamber are at either ends of the gas discharge device. The magnetic field serves to increase the light output in the desired spectral region as described in the above-cited patent application. An outer glass cylinder 96 encloses the gas discharge chamber 82. A phosphor layer 98 on the inner surface of the glass tube 96 converts the output light energy from the gas discharge into the frequency spectrum to which the laser rod is most receptive. Water-cooling channels 100 are provided for the electron collector structure 86, and forced-air cooling may be provided between the transparent cylinders 84 and 96.

FIG. 5 shows a system which is similar to that of FIG. 1. In the case of the system of FIG. 5, however, both a microwave search radar 112 and a laser search radar 114 are employed. The mircrowave search radar provides coarse position information to the computer 116. This coarse position information is employed to orient the laser search radar 114. Following initial orientation of the laser apparatus 114, it is energized to provide more accurate position information. A suitable apparatus for the laser radar is disclosed in FIG. 6. Information from the laser apparatus 114 is supplied to additional computer circuitry 118 and this information is employed to orient the remaining laser units 120, 122 and 124. In addition, once the laser radar 114 "locks on" to the target, the output from computer circuitry 116 is disabled by switch 125. The laser apparatus 114, 120, 122 and 124 may be energized in the proper timed relationship by the modulation control circuitry 126. In order to obtain proper energization of the various laser units, the distances from each laser to the space vehicle 14 should be considered, in combination with the duration of the light pulse to be emitted from each of the laser apparatus. In cases of a relatively long pulse of energy, all of the lasers in the array may be energized simultaneously. However, in the case of very brief pulses, it may be necessary to delay the triggering of the more remote lasers to obtain simultaneous application of energy from all of the lasers to the space vehicle 14. Simultaneous initial application of the energy pulses from all of the lasers is particularly useful to produce the desired thermal shock wave.

With regard to the spacing and number of the laser apparatus making up the array, these factors may be determined by the intensity of the individual lasers and the purpose for which the array is to be employed. Thus, with the relatively low-power lasers which are currently available, a large number, such as 100, or 1000, or more lasers might be required in order to disable a space vehicle. In the case of more powerful lasers, a lesser number such as 3, 5 or 10 laser apparatus would be sufficient. In either case, the overall length and/or width of the array should be relatively large, preferably from a few hundred feet to several miles or more. The laser units should be widely dispersed so that the beams do not overlap significantly prior to incidence on the object to which they are directed. As noted above, one advantage of this type of dispersion is the reduced attenuation which is present at the lower radiation intensity levels within the earth's atmosphere.

It may also be noted that the system of FIG. 5 is suitable for communication with remote space vehicles in addition to the disabling of closer objects. In the case of communications systems, suitable intelligence is applied to the laser beams by the modulation control circuitry. Techniques for simple on-off forms of modulation are known (see the Kerr cell arrangement of FIG. 2), and more sophisticated broad-band modulation schemes are at well advanced stages of development. The intensity level at the receiving space vehicle or other object is, of course, greatly reduced for communications systems, as compared with weapons systems.

FIG. 6 illustrates schematically one arrangement for an optical radar system. In the arrangement of FIG. 6, a laser apparatus 132 is mounted for movement with a telescope 134. The movement of the laser and telescope are controlled by servomotors 136 and 138, with the motor 136 controlling elevation and the motor 138 controlling azimuth. The telescope 134 is provided with a "zoom" type lens assembly 140 which may be driven by the motor 142 through any suitable mechanical linkage. The phrase "zoom type lens" refers to any of the well-known forms of lenses used in the television presentation of sports events to increase the magnification while retaining focus. Light picked up by the telescope 134 is applied to the optical detector 144.

Figure 8:
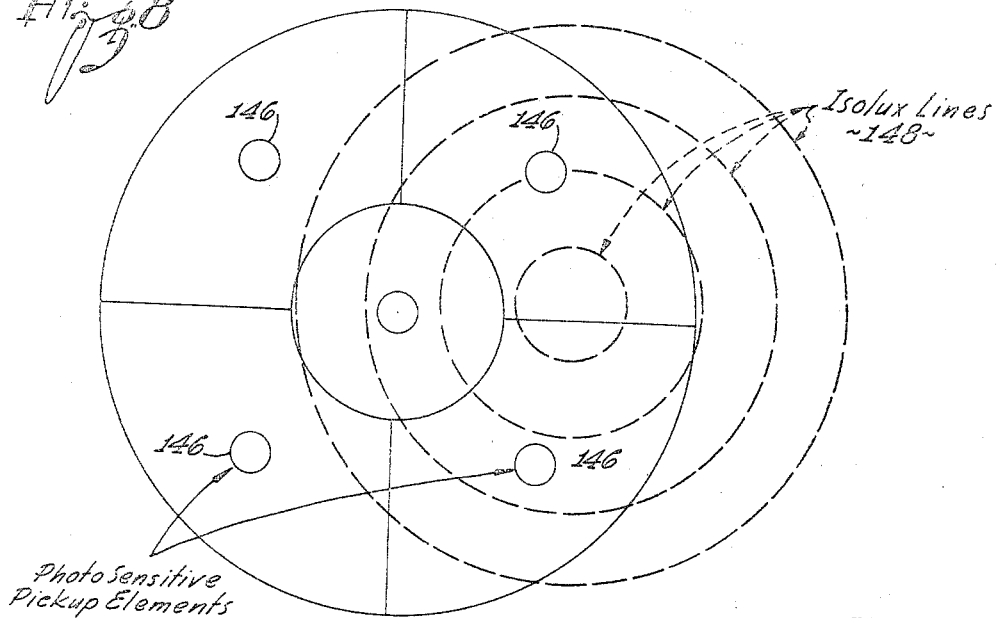
FIG. 8 is a diagram indicating the nature of the simplified light detector employed in the apparatus of FIGS. 6 and 7.

FIG. 7 is a block circuit diagram indicating the mode of operation of the servosystem including the telescope 134 and laser 132. The light detector 144 of FIGS. 6 and 7 may have the geometric arrangement shown in FIG. 8. Thus, it includes a plurality of photosensitive pick-up elements 146. When light falls on these photosensitive elements, the servomotors are energized so that the light intensity pattern 148 of FIG. 8 is shifted to coincide with the array of photosensitive elements. The relative energization of the upper and lower light detectors is employed to selectively energize the elevation servomotor in the proper direction, and the relative energization of the left and right-hand detectors controls the direction of energization of the azimuth servomotor. The output signals to the servocomputer circuitry 150 of FIG. 7 is indicated by the circuit 152. The several control leads to the servomotors 136, 138, are represented by lead 154. Orientation information signals derived from the servomotors or associated digital code wheels are supplied to the computer 150 over leads 156.

The optical system may be provided with suitable filters, light shields, and absorbing material, to increase the signal-to-noise ratio. A single telescope may be employed for both transmission and reception of signals. When the detected light signals reach a predetermined level, the switch 125 of FIG. 5 is energized.

When the central photosensitive pick-up element 146 of FIG. 8 is energized more brightly than any of the four adjacent pick-up elements, the motor 142 controlling the "zoom" lens is stepped forward by a signal applied over lead 158 to increase the size of the image 148 of the reflected signals from the remote object. The servomotors are then re-energized to more accurately position the laser radar apparatus on the remote target. Instead of stepping action, the zoom lens assembly may be actuated by a continuous servo system having a suitably slower time constant with respect to the orientation servo so that hunting and overshooting do not occur.

By the arrangement described above, using a "zoom" type lens, the accuracy of orientation can be increased from that roughly corresponding to the microwave radar system 112 with which it is associated, to a much higher degree of angular orientation accuracy. Zoom-type lenses are well known in the prior art and are described in the patent as well as other literature. Servosystems for optical alignment are also known and one representative system is described, for example, in a Patent No. 2,982,859 to E. E. Steinbrecher, granted May 2, 1961.

It is to be understood that the above-described arrangements are illustrative of the application of the principles of the invention. Numerous other arrangements may be devised by those skilled in the art without departing from the spirit and scope of the invention. Thus, by way of example and not of limitation, the various known techniques of information theory and data handling which have been developed for radar and fire control systems may be employed in the implementation of the circuits of the present invention; thus, suitable use may be made of known global ballistic trajectory equations and prediction techniques to compensate for instrumentation and data processing lags, in the orientation of the laser apparatus. Accordingly, it is to be understood that the present invention is limited only by the spirit and scope of the appended claims.

What is claimed is:

1. In a light energy transmission system, a plurality of widely-spaced laser apparatus, means for directing all of them toward an object above the earth's atmosphere along different paths through the atmosphere, to prevent the ionization of air and execessive attenuation of light energy, and means for energizing each laser apparatus to transmit radiant energy to reach said object concurrently.

2. In a directive radiant energy emissive system, a coarse microwave radar object-location apparatus, a fine laser-radar object-location apparatus, an array of similar high-power lasers, means for directing said laser object locator from said microwave radar, means for directing a plurality of the lasers of said array from said laser-radar, and means for triggering a plurality of said lasers to direct energy to reach a predetermined tracked object at the same time.

3. In combination, a long-range radar system for detecting the position of objects in space above the earth's atmosphere, and array of lasers, means for directing a plurality of the lasers in said array toward a selected one of said objects under the control of said radar system, and means for triggering said lasers to direct energy to reach said object at the same time.

4. In a directive radiant energy emissive system:
a coarse microwave radar object-location apparatus;
a fine laser-radar object-location apparatus;
an array of lasers;
means for directing said laser object locator from said microwave radar;
means for disabling said microwave radar upon accurate orientation and locking of said laser object locator;
means for directing a plurality of the lasers of said array from said laser-radar; and
means for triggering said lasers to direct energy to reach said tracked objects at the same time.

5. In a directive radiant energy emissive system:
a coarse microwave radar object-location apparatus;
a fine laser-radar object-location apparatus, said laser-radar apparatus including simplified angle detection light transducer arrangements, a zoom-type lens for applying reflected light signals to said light transducer arrangements, means for orienting said laser-radar in accordance with signals from said detector, and means for increasing the magnification provided by said zoom-type lens;
an array of lasers;
means for directing said laser object locator from said microwave radar;
means for disabling said microwave radar upon accurate orientation and locking of said laser object locator;
means for directing a plurality of the lasers of said array from said laser-radar; and
means for triggering said lasers to direct energy to reach said tracked objects at the same time.

6. In combination:
a plurality of laser apparatus having a total energy output above the normal ionization level of the atmosphere, each of said laser apparatus having an output level below that required for atmospheric ionization;
means for supporting said laser apparatus in spaced locations; and
means for directing them at a common target and energizing them to apply energy to said target at the same time.

7. In combination:
a plurality of spaced high intensity laser apparatus;
means for directing them toward a single target area; and
means for energizing them to apply radiant energy to said target area at the same time.

References Cited

UNITED STATES PATENTS 2,930,894  3/1960  Bozeman _____ 88—1

OTHER REFERENCES

"Optical Ranging System Uses Laser Transmitter," by M. L. Stitch, E. J. Woodbury and J. H. Morse, Electronics, vol. 34, No. 16, Apr. 21, 1961, pp. 51–53 relied upon.

"Lasers: Devices and Systems, Part III," by Sy Vogel and Leon Dulberger, Electronics, Nov. 10, 1961, pp. 81–82 relied upon.

RODNEY D. BENNETT, *Primary Examiner.*

M. F. HUBLER, *Assistant Examiner.*

U.S. Cl. X.R.

331—94.5